United States Patent [19]

Burkhead

[11] 4,325,718

[45] Apr. 20, 1982

[54] SNAP TOGETHER POCKET FILTER ARRANGEMENT

[75] Inventor: Robert B. Burkhead, Shepherdsville, Ky.

[73] Assignee: Allis-Chalmers Corporation, Milwaukee, Wis.

[21] Appl. No.: 260,126

[22] Filed: May 4, 1981

[51] Int. Cl.³ .................................................. B01D 46/02
[52] U.S. Cl. ........................................ 55/378; 55/483; 55/499; 55/509; 55/521
[58] Field of Search ................... 55/341 R, 378, 379, 55/483, 484, 497–499, 509, 521

[56] References Cited

U.S. PATENT DOCUMENTS

| 3,190,059 | 6/1965 | Bauder et al. | 55/499 |
| 3,541,767 | 11/1970 | Getzin et al. | 55/483 |
| 3,871,848 | 3/1975 | Smith | 55/483 |
| 3,873,286 | 3/1975 | Wurtenberg | 55/378 |

*Primary Examiner*—Bernard Nozick
*Attorney, Agent, or Firm*—Thomas G. Anderson

[57] ABSTRACT

A pocket filter cartridge having a plurality of side-by-side filter bags secured to a filter header assembly adapted to be secured across a dirty gas stream in a gas duct. The header assembly includes a generally rectangular frame in which the filter bags are secured by collars mounted in the mouths of each of the bags which are held together by clip members to clamp the bags between the collars and the frame to secure the bags to the header assembly.

6 Claims, 4 Drawing Figures

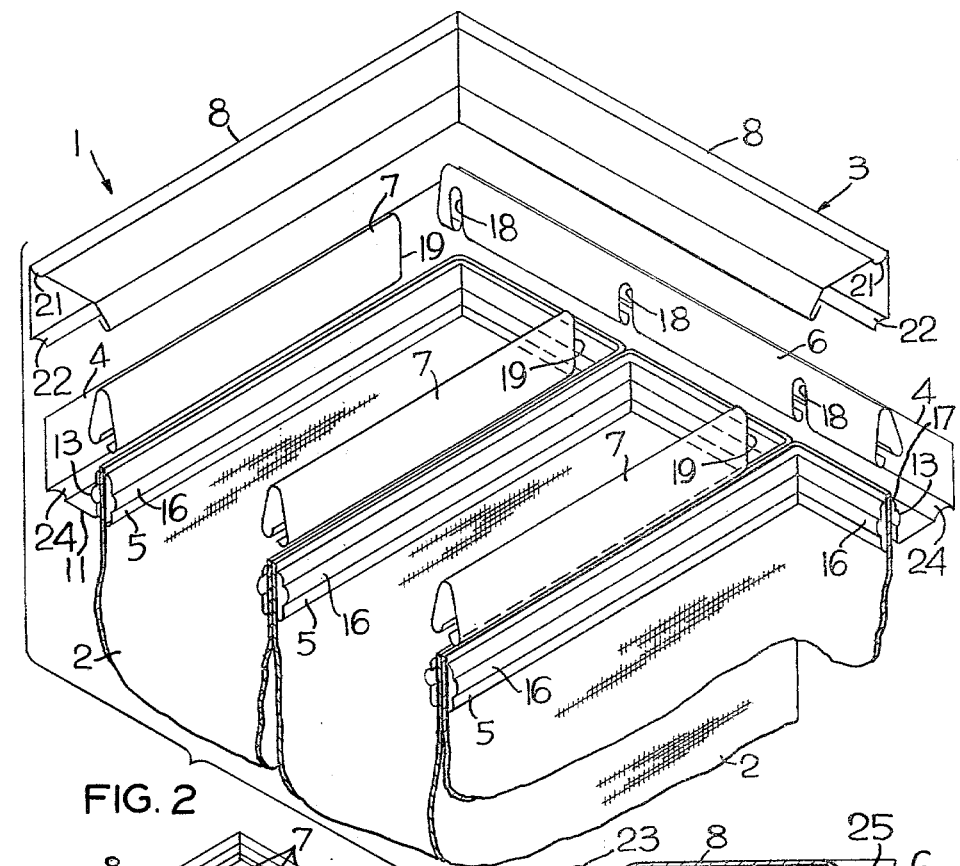
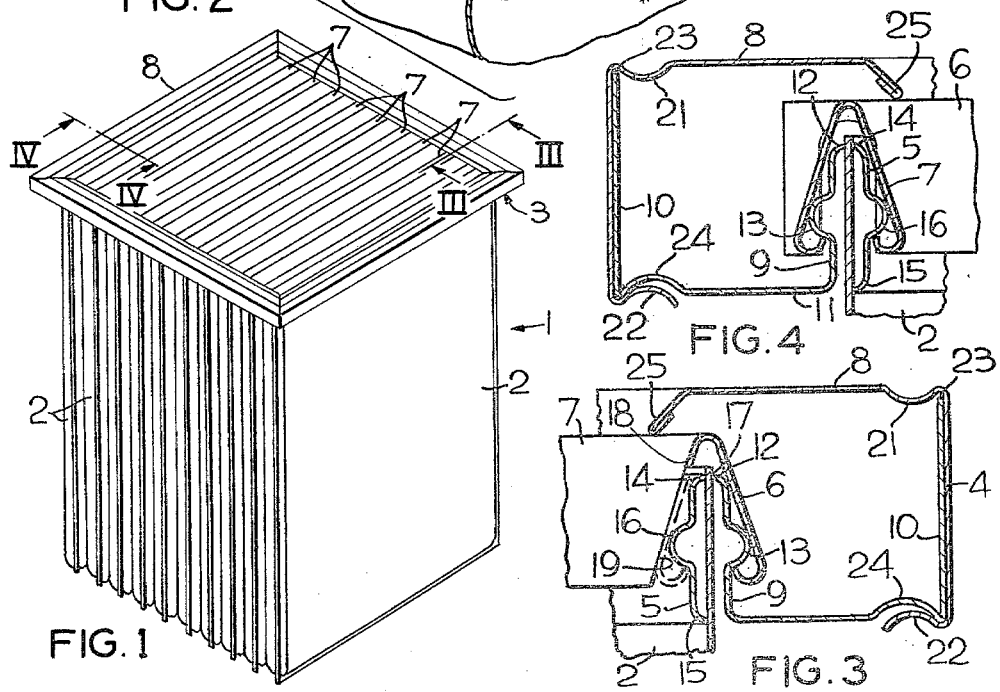

SNAP TOGETHER POCKET FILTER ARRANGEMENT

BACKGROUND OF THE INVENTION

1. Field of the Invention

The present invention relates to gas separation devices and in particular to a pocket filter cartridge for removing particulate solids from a dirty gas stream.

2. Description of the Prior Art

As exemplified by U.S. Pat. Nos. 3,190,059 and 3,871,848, the prior art discloses a variety of pocket filter arrangements. As shown in the foregoing patents, a pocket filter cartridge generally includes a plurality of relatively flat, sheath-like filter bags secured to a common mounting frame to form a filter cartridge having a series of filter pockets suspended from the frame in adjacent side-by-side relation. Typically, one or more of the cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge is installed in its place. Thus, it is particularly desirable for the filter cartridge to be of a durable and lightweight construction which is easy to assemble and inexpensive to make.

SUMMARY OF THE INVENTION

The present invention relates to gas separation devices and in particular to a snap-together filter header arrangement in a pocket filter cartridge suitable for removing particulate solids from a dirty gas stream.

The filter cartridge includes a plurality of relatively flat, sheath-like filter bags affixed in side-by-side relation to a generally rectangular mounting frame which is adapted to be secured across a dirty gas stream. When assembling the filter cartridge, an elongated rectangular clamping collar is installed in the mouth of each of the filter bags. This accommodates securing the filters to the frame by clamping them between the inner periphery of the frame and the adjacent collars. The collars, and thus the filters, are then secured to the frame by a plurality of clip members which are slid over oppositely projecting beads provided on the frame and the inner periphery of each of the collars to secure the adjacent collars and the frame together in a spring clamping fashion. Then, after all of the filters have been secured to the frame in this manner, a channel-shaped cover is secured over each side of the frame.

From the foregoing, it can be seen that the filter cartridge embodying the invention is of a relatively lightweight and durable design which is easy to fabricate and assemble. However, it is to be understood that various changes can be made in the arrangement, form and construction of the apparatus disclosed herein without departing from the spirit and scope of the invention.

DESCRIPTION OF THE DRAWINGS

FIG. 1 is an isometric view of the filter cartridge;

FIG. 2 is an exploded partial isometric view of the filter cartridge;

FIG. 3 is an enlarged cross-sectional view taken along line III—III in FIG. 1; and FIG. 4 is an enlarged cross-sectional view taken along line IV—IV in FIG. 1.

DESCRIPTION OF THE PREFERRED EMBODIMENT

As shown in FIG. 1, the filter cartridge 1 includes a plurality of relatively flat, sheath-like filter bags 2 secured to a generally rectangular filter header assembly 3 which is adapted to be removably secured across a dirty gas stream in a gas duct. As discussed above in regard to the prior art, this type of cartridge is typically secured across the gas duct so that particulate materials are separated from the gas stream as it flows through the filter media from the interior of each of the filter bags.

Referring to FIGS. 2–4, the header assembly 3 is preferably of a roll-formed sheet metal construction which includes a generally rectangular frame 4, an elongated rectangular collar 5 in the mouth of each of the filter bags, a plurality of V-shaped clip members 6 and 7 adapted to secure the collars 5 to the inner periphery of the frame 4 and to one another, and a channel-shaped cover 8 secured over each side of the frame.

Each side of the frame 4 is of a generally U-shaped cross-sectional configuration having inner and outer flanges 9 and 10 interconnected by a central base portion 11. As shown in the drawings, the inner flange 9 is formed with an inwardly projecting lip 12 and an outwardly projecting bead or dimple 13 which extends about the entire inner periphery of the frame 4. Similarly, each of the elongated rectangular collars 5 is provided with outwardly projecting upper and lower lips 14 and 15 and an inwardly projecting bead or dimple 16, all of which are sized and positioned to cooperate with one another and with the bead 13 and lip 12 on the frame to secure the filter bags to the header assembly. When assembling the filter cartridge, a workman first inserts one of the collars 5 in the mouth of each of the filter bags and then aligns the collars and the filter bags in an adjacent, side-by-side fashion across the width of the frame as shown in FIG. 2. Next, the workman secures the filter bags to the inner flanges 9 extending along the edges of the bags on the opposite sides of the frame as indicated at 17. This is accomplished by pressing a relative rigid, yet resilient, V-shaped clip member 6 downwardly over the outwardly and inwardly projecting beads 13 and 16 on each side of the frame so that the media at the edges of each of the filter bags is secured to the frame 4 between the lips 12 and 14 by the clamping action of the clip members 6 as shown in FIG. 3. In this regard, it should be noted that the clip members 6 include notches 18 which provide sufficient clearance for it to be pressed onto the beads 13 and 16 without interfering with the side panels of the filter bags or with the elongated sides of the collars 5.

Upon securing the end edges to the frame 4, the workman presses a similarly formed relatively rigid, yet resilient, V-shaped clip member 7 downwardly over the outwardly and inwardly projecting beads 13 and 16 on the two sides of the frame to clamp the side panels of the filter bags between the lips 12 and 14 as shown in FIG. 4. Thereafter, one of the clip members 7 is pressed over each pair of the oppositely projecting beads 16 of each of the adjacent sides of the collars to clamp the remaining filter panels between the lips 14 and 15. As shown in the drawings, each of the clip members 7 extends entirely across the frame 4 and its ends are leveled to abut the clip members 6 extending across the opposite sides of the frame as shown at 19 in FIG. 3. Thus, in addition to maintaining a seal between the adjacent panels of the filter bags, the clip members 7 also provide a relatively rigid support for the filter bags between the opposing sides of the frame.

After all of the filter bags have been secured to the frame, one of the channel-shaped covers 8 is secured to each side of the frame. In this regard, it should be noted that the covers 8 are mitered on each end so that they fit together to cover the entire periphery of the frame.

As in the case of the clip members 6 and 7, the covers 8 are secured to the frame by a snap-fit type mechanical joint. Specifically, a pair of inwardly projecting beads 21 and 22 are formed in the covers which extend along the length of each cover. This allows a workman to secure each of the covers to the frame by pressing it inwardly until the beads 21 and 22 snap or slide over the outer flange 10 so that the bead 21 is retained by the end of the outer flange as indicated at 23 and the bead 22 is retained by the dimple or groove 24 formed in the base of the frame. Once the covers are secured to the frame, they also serve to retain the clip members 7 within the header assembly. As shown in the drawings, each of the covers includes a diagonally extending baffle portion 25 which overlies and abuts each of the clip members 7 to prevent them from working loose during transit or use of the filter cartridge.

From the foregoing, it can be seen that the filter header assembly of the filter cartridge embodying the invention is relatively lightweight and easy to manufacture with commonly available sheet metal working equipment. However, it is to be understood that while the header assembly is preferably made of sheet metal, the invention also contemplates the use of various thermo-plastics or other easily formed materials in the assembly.

The embodiments of the invention in which an exclusive property or privilege is claimed are defined as follows:

1. A pocket filter cartridge for removing particulate solids from a dirty gas stream, comprising:
   a plurality of relatively flat, sheath-like filter bags open at one end;
   a generally rectangular bag mounting frame adapted to be secured across the dirty gas stream;
   said frame having outwardly projecting bead portions and inwardly projecting filter clamping portions extending about its periphery;
   a plurality of generally rectangular clamping collars sized to be positioned across the frame in adjacent side-by-side relation;
   each of said collars fitting in the open end of one of the filter bags and including inwardly projecting bead portions and outwardly projecting filter clamping portions disposed about its perimeter; and
   clip means slidably engaged about the oppositely projecting bead portions of the adjacent collars and the frame in spring clamping fashion to secure each of the filters to the frame between the respective clamping flanges of the collars and the frame.

2. The filter cartridge according to claim 1, and
   said clip means including a plurality of first elongated V-shaped clamping members spanning the width of the filter bags and a pair of second elongated V-shaped clamping members spanning the frame at the opposite ends of said first elongated members.

3. The filter cartridge according to claim 1, and
   each side of said frame being a U-shaped section having inner and outer flanges and a central base portion; and
   said outwardly projecting bead portions and said filter clamping portions being formed in said inner leg.

4. The filter cartridge according to claim 1, and
   a channel shaped cover secured over each of said channel sections; and
   said cover including a pair of inwardly projecting opposing bead portions in spring clamping engagement with said outer flange and base portion to secure the cover to the channel section.

5. The filter cartridge of claim 1, and said covers including an inner baffle portion overlying said clip means to retain said means in the filter securing position.

6. The filter cartridge of claim 1, and said mounting frame, clamping collars, and clip means being of a roll-formed sheet metal construction.

* * * * *